May 29, 1923.
F. W. BORTON
ELECTRIC SOLDERING IRON
Filed Oct. 18, 1921
1,456,760
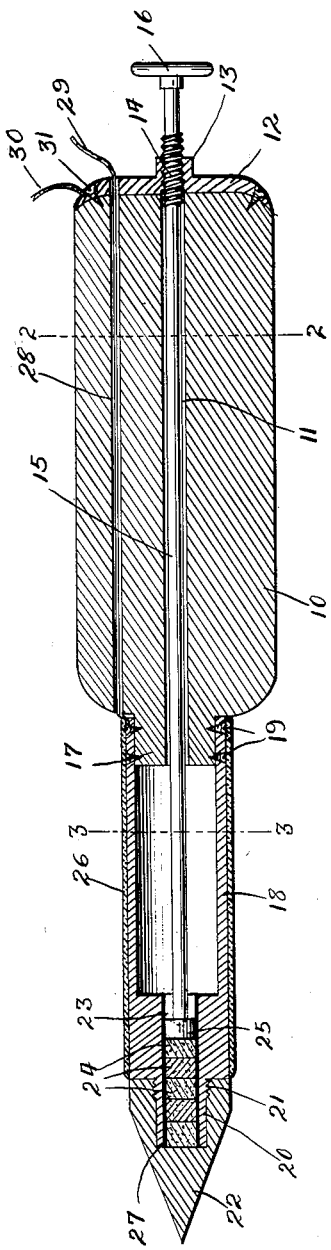
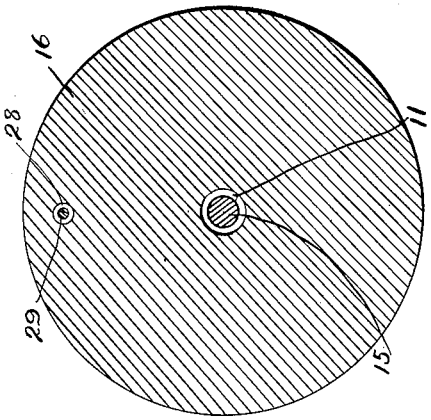
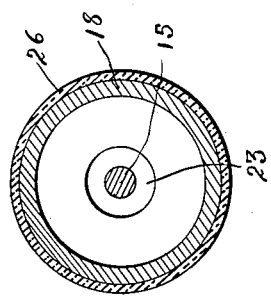
Inventor
Frederick W. Borton
By Knight Bros
Attorneys Patented May 29, 1923.

1,456,760

UNITED STATES PATENT OFFICE.

FREDERICK W. BORTON, OF MIAMI, FLORIDA.

ELECTRIC SOLDERING IRON.

Application filed October 18, 1921. Serial No. 508,436.

*To all whom it may concern:*

Be it known that I, FREDERICK W. BORTON, a citizen of the United States, and a resident of Miami, in the county of Dade and State of Florida, have invented certain new and useful Improvements in Electric Soldering Irons, of which the following is a specification.

My invention relates to electric soldering irons and has for its particular advantage to provide a soldering iron which may be used with electric currents of any voltage.

It has been customary in electric soldering irons to heat the same by an electric arc. In contradistinction to this general type my invention is so designed that the point of the soldering iron will be heated by electrical resistance.

In carrying out my invention I form adjacent the copper tip of the soldering iron a chamber which is adapted to receive a plurality of carbon discs, the number of which may be varied according to the voltage of the electric circuit supplying current to the soldering iron. The heat of the point is accomplished by the resistance set up by the carbon discs in the electric circuit, the carbon discs being in such a position that the heat is transmitted to the copper tip. Furthermore, access to the chamber containing the carbon discs may easily be had thereby enabling the number of discs to be varied and to permit a replacement of the discs which may become oxidized.

In addition to the hereinbefore mentioned feature the construction of my improved soldering iron is exceedingly simple, cheap in manufacture and durable in service.

The details of construction of my invention will be made more apparent in the accompanying specification and drawings in which:

Fig. 1 is a longitudinal section of a soldering iron constructed in accordance with my invention, Fig. 2 is a transverse section on line 2—2 of Fig. 1, and Fig. 3 is a transverse section on line 3—3 of Fig. 1.

In the drawings the numeral 10 indicates the handle of the soldering iron which may be of wood, bakelite or any other suitable material, and which is provided with a central longitudinal bore 11 for a purpose to be more fully hereinafter described. Secured to one end of the handle 10 is a metal plate 12 formed with a central boss 13 internally screw-threaded to engage the screw threaded portion 14 of an adjusting rod 15 disposed centrally of the soldering iron. The outer end of the adjusting rod 15 is provided with an operating handle 16 by which the same may be rotated to displace it longitudinally of the soldering iron.

The handle 10 is formed with a reduced cylindrical portion 17 to which a metallic cylindrical housing 18 is secured by screws 19 or the like. This housing 18 is formed with a tubular extension 20 externally screw-threaded as at 21 to receive the copper tip or head 22 of the soldering iron, which is internally screw-threaded to engage the screw-threads 21. The tubular extension 20 is a continuation of a bore formed in the housing 18 thereby providing a chamber 23.

The chamber 23 is adapted to receive a plurality of carbon discs 24, the number of the discs varying in accordance to the voltage of the circuit in which the soldering iron is to be connected. This stack of carbon discs is confined within the chamber 23 by the copper tip 22 at one end and the bearing block 25 carried by the adjusting rod 15, at the other. The thickness of the carbon discs may be varied in accordance with the propensity of the use to which the iron might be subjected and the opposite bearing faces of the discs may be either plain or corrugated as desired.

Surrounding the metallic housing 18 there is provided a tubular insulator 26 of asbestos or any other suitable material, thus confining the heat generated by the carbon discs within the housing 18. The chamber 23 is provided with a lining 27 of mica or other suitable material.

The handle 10 is preferably bored as at 28 to accommodate a wire 29 of the electric circuit supplying current to the iron. The terminal of this wire is at the housing 18 to which it may be attached by one of the screws 19. The other wire 30 is attached to the metal plate 12 by a screw 31. The circuit can be traced as follows: from wire 29 through housing 18, copper tip 22, carbon discs 24, bearing plate 25, adjusting rod 15, plate 12, to the wire 30.

In using my improved soldering iron the tip 22 is removed from the tubular extension 20 thereby permitting access to the chamber 23. The voltage of the circuit in which the soldering iron is to be connected having first been determined, the number of carbon discs are placed within the chamber 23, the number depending on the voltage of the electric circuit. The tip 22 is thereafter screwed into place and the adjusting rod 15 rotated to cause the bearing block 25 to engage the stack of discs 24 and cause them to impinge one another. When therefore, the current is permitted to pass through the iron, heat will be generated in the point 22 by the resistance set up in the circuit by the plurality of carbon discs 24. The degree of heat that may be obtained is variable by increasing or decreasing the pressure on the carbon discs 24, an increase of the pressure permitting a greater current to flow through these carbon discs and consequently a greater heat.

Aside from the adjustment which the rod 15 provides, the iron is to some extent self-regulating. Because of its elongated shape the iron as it becomes heated expands slightly and thereupon relieves the pressure on the carbon discs. As the iron cools, the corresponding contraction of the parts of the iron again increase the pressure on the carbon discs, thereby tending to increase their heating propensity. This expansion and contraction of the iron, together with its effect upon the carbon discs tends to maintain the iron at a suitable soldering temperature without a constant adjustment of the rod 15 being necessary.

The construction of the heating element of the iron is such that it may be operated from any source of current either direct or alternate, or by a storage battery.

In practice, the carbon discs may be put up in packages so as to be inserted by the user who may thereby quickly and easily adapt the iron for use in circuits of any voltage and furthermore may quickly replace any of the carbon discs that might become oxidized.

While I have described and illustrated one embodiment of my invention, I do not wish to unnecessarily limit the scope of this invention, but reserve the right to make such modifications and rearrangements of the several parts as may come within the purview of the accompanying claim.

Having thus described my invention, what I claim is:

In an electric soldering iron a metallic housing, a tubular projection formed on said housing, a copper tip removably mounted on said projection, said housing being formed with a chamber adjacent said tip, a wooden handle secured to said housing, a metallic plate secured to the end of said handle, an adjusting rod disposed centrally of said tool and screw-threadedly engaging said plate, the end of said adjusting rod projecting into said chamber, a resistance element comprising a plurality of discs disposed within said chamber, said adjusting rod acting to regulate the pressure on said discs and an electric circuit for causing a current of electricity to pass through said resistance element, substantially as and for the purpose described.

FREDERICK W. BORTON.